United States Patent [19]

Lockery

[11] 4,261,429

[45] Apr. 14, 1981

[54] UNITIZED WEIGHING APPARATUS AND METHOD FOR MAKING SUCH AN APPARATUS

[75] Inventor: Harry E. Lockery, Sudbury, Mass.

[73] Assignee: Hottinger Baldwin Measurements, Inc., Framingham, Mass.

[21] Appl. No.: 105,157

[22] Filed: Dec. 19, 1979

[51] Int. Cl.³ .......................... G01G 3/14; G01L 5/12
[52] U.S. Cl. .................................. 177/211; 73/141 A
[58] Field of Search ...................... 177/211; 73/141 A

[56] References Cited

U.S. PATENT DOCUMENTS

| | | | |
|---|---|---|---|
| 3,439,761 | 4/1969 | Laimins | 73/141 A |
| 3,966,003 | 6/1976 | Miller | 177/211 |
| 3,968,683 | 7/1976 | Ormond | 177/211 X |
| 4,009,608 | 3/1977 | Ormond | 73/141 A |
| 4,125,168 | 11/1978 | Ormond | 177/211 |
| 4,146,100 | 3/1979 | Jacobson et al. | 177/211 |
| 4,150,729 | 4/1979 | Ormond | 177/211 |

*Primary Examiner*—George H. Miller, Jr.
*Attorney, Agent, or Firm*—W. G. Fasse; D. F. Gould

[57] ABSTRACT

A platform and transducer elements are combined so that the transducer elements form integral components of the platform proper. For this purpose slots are milled, machined or cut into the platform so that two parallel slots define a beam structure, the sensitivity of which is established by drilling holes into the platform, at the end of each slot and intermediate the ends of each slot. Strain gage elements are then secured to the so formed beam structures, the free end of which are operatively connected to support elements. Overload limiting means are so arranged that the flexing of each beam structure is limited to a predetermined value.

23 Claims, 19 Drawing Figures

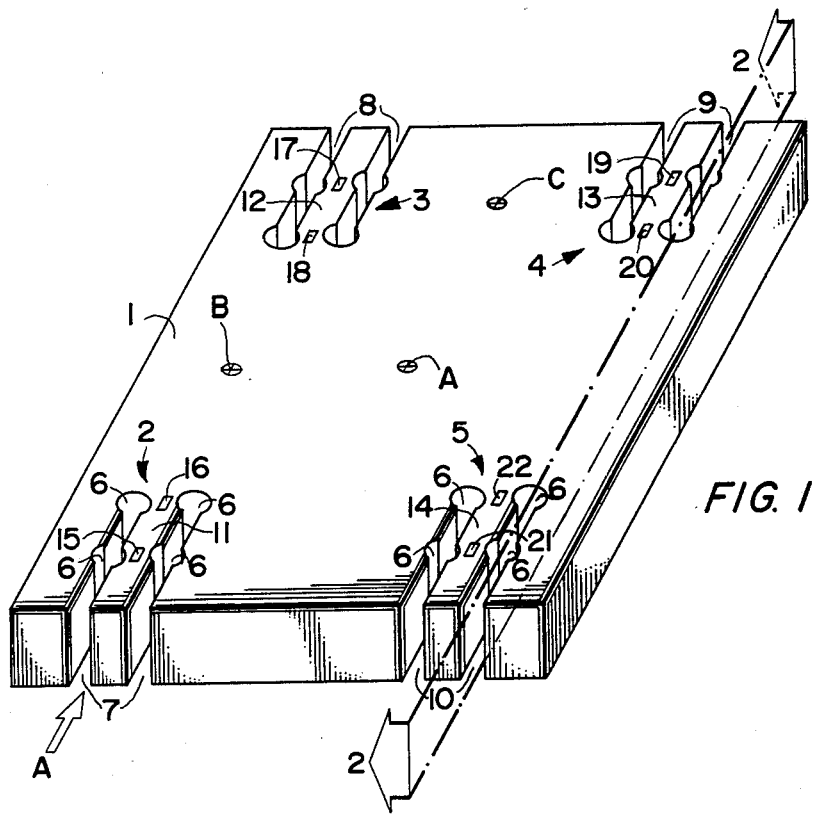
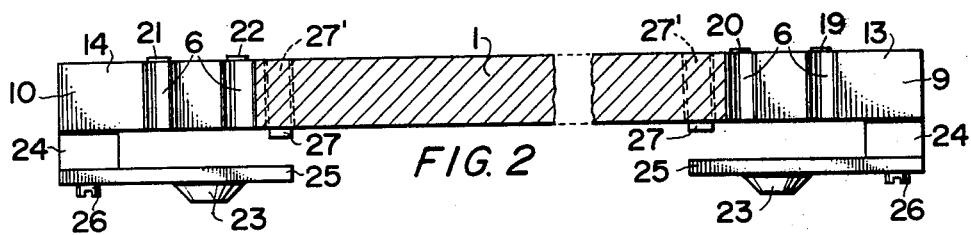
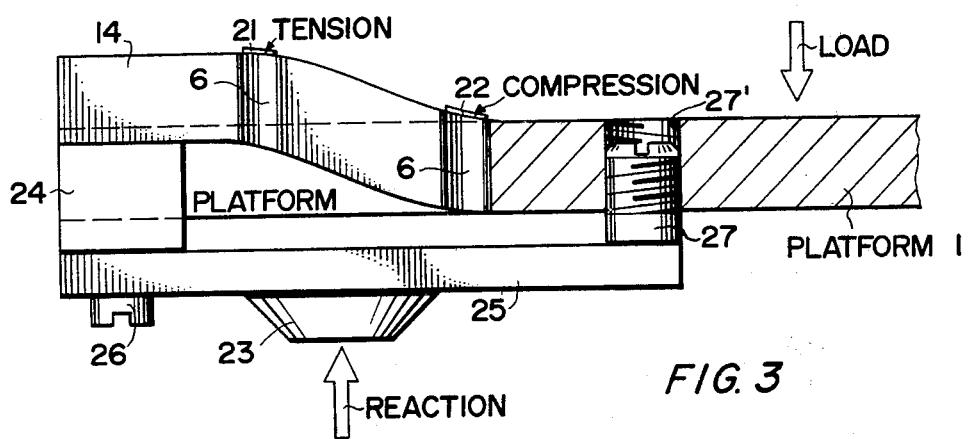

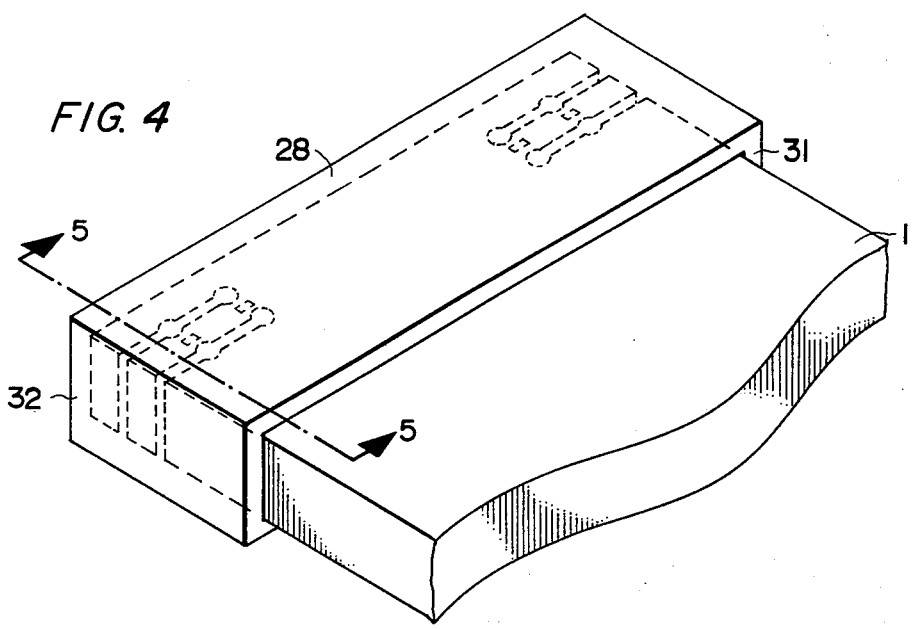
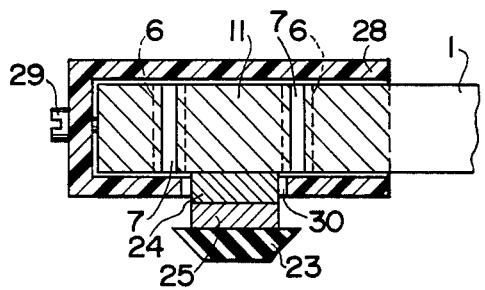
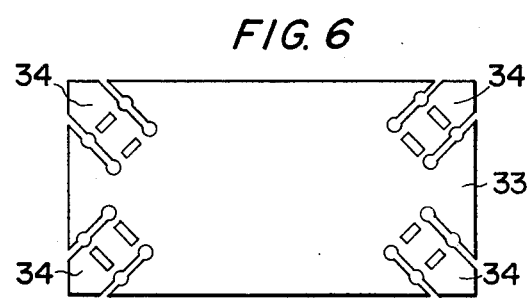
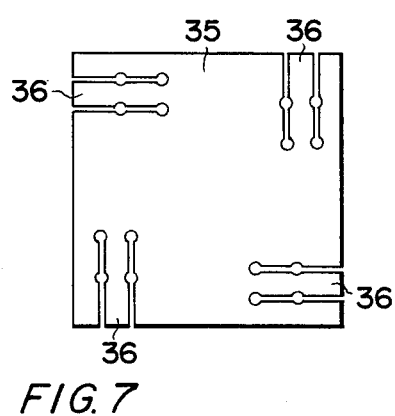
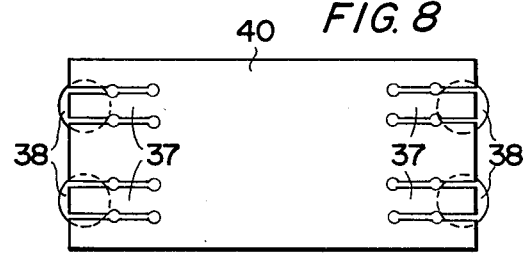
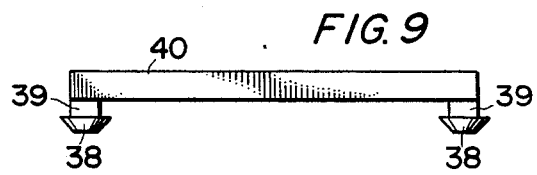

UNITIZED WEIGHING APPARATUS AND METHOD FOR MAKING SUCH AN APPARATUS

BACKGROUND OF THE INVENTION

The present invention relates to a weighing apparatus and to a method of making such an apparatus. More specifically, the invention relates to platform scales of the electronic type.

Prior art electronic scales are equipped with strain gage transducers which are separately manufactured and then secured to a platform in many different arrangements. Typically, a platform structure is supported in each corner by a single transducer arranged between the platform proper and a base. In another prior art scale the platform structure is secured to the base by flexural members and the load on the platform proper is sensed by a single transducer connected between the upper platform and the base structure. In still another version a single transducer supports an upper platform on a base and the flexural members form an integral part of the single transducer.

Where four separate transducers are required to support the platform on a base, one transducer is normally mounted in each corner. This type of structure is rather expensive since four separate transducers must be fabricated and it is expensive to provide each transducer with the precision compensation and calibration characteristics which are necessary for precision weighing. Once the individual transducers, the upper platform and the base have been assembled, in itself an expensive operation, the entire assembly must again be calibrated and adjusted to minimize effects of eccentric load applications. The additional electronic components required for the reduction of eccentric load effects also contribute to increased expense.

While in the prior art, wherein the platform is connected to the base by flexural members, the number of transducers is reduced, the flexural members and the base must be carefully assembled and adjusted so that the single transducer will sense only the vertical load applied to the upper platform. Making such scales insensitive to off-center loads has been found to be difficult, time consuming, and expensive. Substantially the same considerations apply to a further prior art structure wherein the flexural members are an integral part of the single transducer. This type of structure is also sensitive to off-center loads unless expensive mechanical or electronic adjustments are made to reduce the effects of off-center loading.

In many of the prior art structures overload protection is not provided or if it is, the expense of doing so is considerable.

OBJECTS OF THE INVENTION

In view of the above it is the aim of the invention to achieve the following objects singly or in combination:
to simplify the manufacture of scales of the described type by integrating the platform structure and the strain gage transducer or transducers in a unitary structure;
to reduce the costs of such scales and to simplify their calibration and adjustment while simultaneously assuring performance and accuracy which is at least equivalent to comparable scales of the prior art;
to construct the scale in such a manner that its output is relatively independent of the position of the load applied to the scale, or stated differently, insensitive to off-center load applications;
to provide overload protection means which limit the flexing of the individual bending beam transducers;
to support the integral scale platform and bending beam transducer structures in such a manner that the desired type of deflection of the integrated transducers is established to optimize the linearity characteristics and hysteresis effects; and
to minimize the effect of shock loads on the scale.

SUMMARY OF THE INVENTION

According to the invention there is provided a weighing apparatus, comprising a platform and strain gage transducer means constructed as an integral part or parts of the platform. Each strain gage transducer has a free end and a fixed end merging into the platform. Strain gage elements are operatively secured to the beam structures. Mounting feet, preferably of resilient material, are secured through spacer elements to the free end of the beam structures serving to support the weighing apparatus on the mounting surface.

According to the invention there is further provided a method for manufacturing scales of the type described by the following steps. First, a platform is prepared. Then a plurality of holes are drilled into the platform in groups of four holes each. A plurality of slots are then machined into the platform whereby they extend inwardly from the edges of the platform so that two slots each extend in parallel to each other; each slot connecting two holes. Thus, two slots form a cantilever type bending beam structure as an integral part of the platform. Thereafter strain gage elements are secured to the beam structure, for example, in the region between two adjacent holes, the strain gage elements electrically interconnected with the strain gage elements secured to the other beam structures to form an electro-mechanically operative weighing structure.

BRIEF FIGURE DESCRIPTION

In order that the invention may be clearly understood, it will now be described, by way of example, with reference to the accompanying drawings, wherein:

FIG. 1 is a perspective view of a scale platform according to the invention with beam structures forming an integral part of the platform, whereby the illustration is not drawn to any actual measurements or dimensions as is customary in patent drawings;

FIG. 2 is a sectional view along section line 2—2 in FIG. 1 without load application to the scale;

FIG. 3 is a view similar to that of FIG. 2, however only of one of the beam structures is shown, on a somewhat enlarged scale and subject to flexing as a result of loading the scale, whereby the deflection of the beam is exaggerated and the deflection of the bracket is not shown for simplifying the illustration;

FIG. 4 is a perspective view of one end of a scale according to the invention provided with a protective cover;

FIG. 5 is a sectional view along section line 5—5 in FIG. 4;

FIG. 6 shows a top plan view of a rectangular scale platform in which the beam structures extend substantially diagonally into the scale platform;

FIG. 7 shows a top plan view of a square scale platform with the beam structures extending alternately at right angles with respect to each of the other beam structures;

FIG. 8 shows a top plan view of a rectangular scale platform with the beam structures extending in parallel to the long sides of the platform;

FIG. 9 is a side view of the scale according to FIG. 8;

Figure 12:
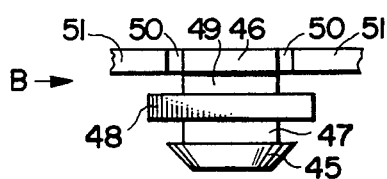
FIG. 12 is a view in the direction of the arrow A in FIG. 1 substantially in the direction of the longitudinal axis of the beam structure with parts of the scale broken away.

DETAILED DESCRIPTION OF PREFERRED EXAMPLE EMBODIMENTS AND OF THE BEST MODE OF THE PRESENT INVENTION

FIG. 1 shows a scale platform 1 made of metal. For example, aluminum alloys number 2024-T351 or 7075-T651 are suitable for low capacity scales. A suitable thickness for the platform 1 would be about 0.25 inches, for example. Alloy steel platforms would be used for scales of higher capacity. Four groups 2, 3, 4, and 5 of holes 6 are drilled entirely through the platform 1. The location of these hole groups relative to the platform and to each other may differ as will be described below. In FIG. 1 the holes are located substantially near a corner of the platform 1. A suitable spacing between adjacent holes 6 and from hole wall to hole wall may be about 0.35 inches.

Further, pairs 7, 8, 9, and 10 of slots are cut into the platform, for example, by sawing so that each slot extends from an edge of the platform inwardly to connect two holes with the edge, whereby four beam structures 11, 12, 13, and 14 are integrally formed as part of the platform structure.

Strain gage elements 15 and 16 are secured conventionally, for example, by means of adhesive to the beam structure 11. Preferably, these strain gage sensing elements are located between holes 6. Similarly, strain gage sensing elements 17 and 18 are arranged on the beam structure 12. Sensing elements 19 and 20 are secured to the beam structure 13. Strain gage sensing elements 21 and 22 are secured to the beam structure 14.

The hole dimensions and the thickness of the platform as well as the width of the slots will depend on the required scale capacity and those skilled in the art are familiar with selecting the proper hole diameter and beam dimensions. These dimensions are selected with due regard to the scale capcity and sensitivity.

FIG. 2 shows the sectional view along section line 2—2 in FIG. 1 thereby illustrating the beam structures 13 and 14 without any load application. The section plane extends through the holes 6 and through the slots 9 and 10 whereby the sectional plane runs centrally and longitudinally through the respective slots.

In addition, FIG. 2 shows one possible support structure including feet 23, preferably made of resilient material such as rubber or the like and secured to the respective free end adjacent the edge of the platform of the corresponding beam structures 13, 14. The connection is acomplished through a spacer 24 and a loading bracket 25. Although FIG. 2 shows only two support structures 23, 24, 25, there are four of these structures, one at each corner. The outer end of each bracket 25 is secured to the spacer 24 by connecting elements 26 such as screws or the like. The inner end of each bracket 25 reaches sufficiently inwardly relative to the platform 1 for cooperation with an overload limit means 27 which may be an adjustable screw in a threaded hole 27' for limiting the maximum flexing of the respective beam structure. The adjustment of the spacing between the inner free end of each bracket 25 and the overload limit stop 27 will be such that the spacing permits a flexing of the beam structure just slightly above the rated load for each corner.

FIG. 3 shows the left-hand corner of FIG. 2 on a somewhat enlarged scale under maximum load effects, whereby the free end of the bracket 25 contacts the load limit stop 27 and the beam structure flexes somewhat in an "S" configuration. Thus, the strain gage element 21 is subjected to tensile strains and the strain gage element 22 is subjected to compressive strains. The mode of deflection shown in FIG. 3 optimizes the linearity characteristics of the beam and associated strain gage sensing elements. The further operation of the present scales will be described subsequently with reference to the circuit diagram of FIG. 15.

FIGS. 4 and 5 show a protective cover 28 secured to the ends of the platform 1 to protect the beam structures, the strain gage elements and the respective electrical wiring. The protective cover 28 may be secured to the platform 1 by screws 29. The feet 23 of the support structure 23, 24, 25 extends through a hole 30 in the cover member 28. The protective cover members may be made of extruded plastic or aluminum, for example, having a rectangular, tubular cross section and slotted on one side thereof to accept the platform 1. The ends 31 and 32 of the protective cover 28 are also closed for complete protection.

In FIG. 6 a schematic top plan view of a platform scale 33 is shown in which the beam structures 34 extend with their longitudinal axis at an angle relative to the edges of the platform 33. In FIG. 7 the platform 35 has a square configuration and the beam structures extend with their longitudinal axes perpendicular to the side of the square into which the respective slots open and parallel to the next adjacent side. This orientation of the beam structures may also be used in a platform of rectangular configuration.

Both have been found to reduce errors introduced by off-center load applications. For example, in a rectangular scale having a platform dimension fourteen by eighteen inches off-center load errors are substantially reduced by the particular orientation of the beam structures shown in FIGS. 6 and 7.

In FIGS. 8 and 9 the beam structures 37 are oriented as in FIG. 1. However, the feet 38 are secured through a spacer 39 to the respective beam element 37 which forms an integral part of the platform 40. This arrangement of the feet 38 obviates the use of the brackets 25 normally employed to achieve a desirable beam deflection characteristic and optimization of linearity. While linearity performance is compromised through the elimination of the brackets 25, the resulting performance is quite adequate for many applications.

Figure 10:
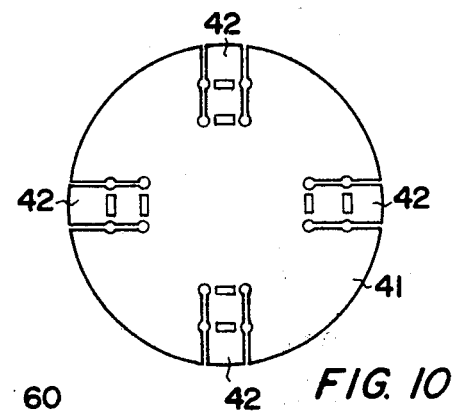
FIG. 10 is a top plan view of a scale platform according to the invention, having a circular shape.

FIG. 10 shows a platform 41 of circular shape. However, the platform could also have another curved shape, for example, an elliptical configuration. In any event, the beam structures 42 would preferably extend radially inwardly and would be spaced from each other at 90°.

Figure 11:
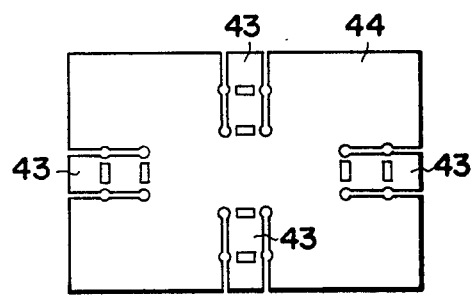
FIG. 11 shows a top plan view of a rectangular scale platform with the beam structures arranged centrally and at right angles relative to each edge of the platform.

In FIG. 11 the beam structures 43 are arranged substantially centrally relative to the edges of a rectangular, or square, platform 44.

Figure 13:
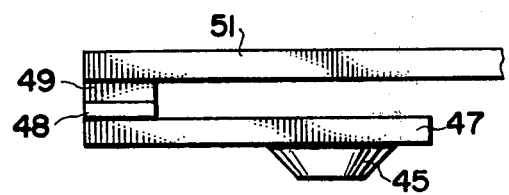
FIG. 13 is a view in the direction of the arrow B in FIG. 12.

FIGS. 12 and 13 show a modified overload stop structure. The foot 45 is connected to the free end of the beam structure 46 through a bracket 47, an overload stop member 48, and a thin spacer shim 49. The length of the overload stop member 48 is longer than the combined width of the beam transducer 46 and the two adjacent gaps 50 so that the free ends of the stop member 48 contact the platform 51 either side of the beam structure 46, when the load on the beam structure 46 deflects to its maximum desired value. The allowable flexing of the beam element 46 is established by the thickness of the spacer shim 49. Thus, any overload is shunted to bypass the beam structure 46 and is taken up by the platform 51. Only the permissible load is taken up by the beam structure 46.

Figure 14:
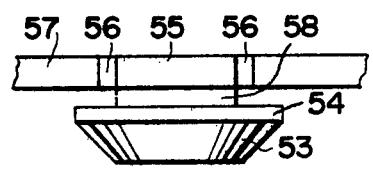
FIG. 14 is a view similar to that shown in FIG. 12, however, showing a foot construction which simultaneously operates as an overload limit.

In FIG. 14 the foot 53 is connected to the free end of beam structure 55 through an overload stop member 54 and a thin spacer shim 58. The overload stop member 58 has a horizontal width larger than the combined width of the beam structure 55 and the gaps or slots 56 in the platform 57. Thus, the foot 53 with its overload member 54 performs the support function as well as the overload stop function. This arrangement is similar to that described in connection with FIGS. 12 and 13 except that the bracket 47 has been eliminated.

Figure 15:
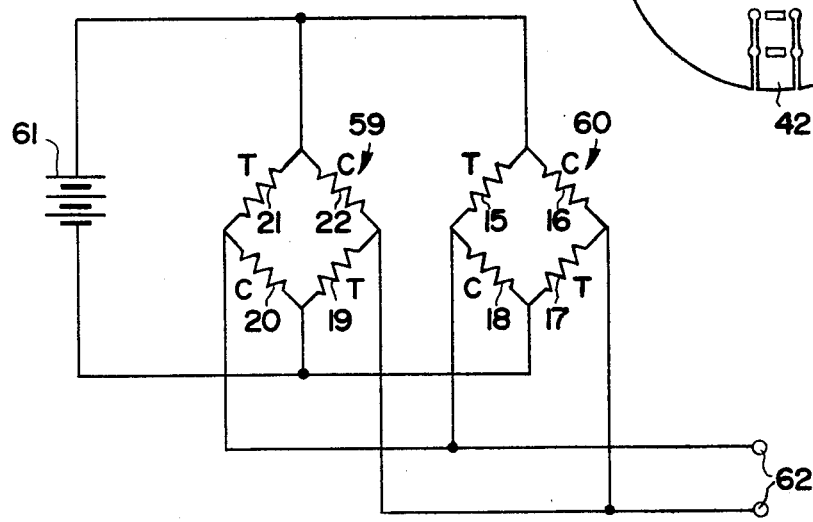
FIG. 15 is a bridge circuit diagram of the strain gage sensing elements arranged according to the invention.

The operation of the invention will now be described with particular reference to FIGS. 1, 3, and 15. According to the invention each beam structure is equipped with two strain gage elements. As shown in FIG. 3, the strain gages 21 and 22 are subjected to tensile and compressive strains, respectively, when the respective beam structure flexes under a load. FIG. 3 shows the flexing of the beam 14 in an exaggerated manner for convenience of illustration. Of course, the bracket 25 also flexes somewhat but this is not shown since it is not relevant to the invention. Similar strains are developed and measured by strain gage elements on the other beam structures 11, 12, 13 provided in the scale. Each of the gage pairs is connected to another gage pair to form a Wheatstone Bridge as shown in FIG. 15. With reference to FIGS. 1 and 15, the gage pairs on beam structures 13 and 14 are interconnected to form one Wheatstone Bridge, 59. The gage pairs on beam structures 11 and 12 are interconnected to form a second Wheatstone Bridge, 60.

With the interconnection arrangement just described, the strains measured by the individual strain gages interconnected within one Wheatstone Bridge and the resistance changes in the strain gages caused by those strains combine in the Wheatstone Bridge to develop a signal voltage when the bridge is properly excited, which is directly related to the sum of the loads on each of the two structural elements. A similar voltage is developed in the other Wheatstone Bridge.

The two Wheatstone Bridges, 59 and 60, are connected in parallel to a common power supply source, 61. The output terminals of bridges 59 and 60 are connected to common output terminals 62. With this parallel interconnection of Wheatstone Bridges, a net output signal at terminals 62 is developed which is equal to the average of the signals developed at the output terminals of the individual Wheatstone Bridges, 59 and 60. In effect, then, the output signal is proportional to the sum of the loads sensed by the individual beam structures and their strain gage elements combined and interconnected in bridges 59 and 60. This form of parallel addition through averaging of the outputs of Wheatstone Bridges is well known in the art.

It will be recognized by those skilled in the art that other combinations of strain gage pairs can be used with substantially identical results. Wherein the foregoing description strain gages on beam structures 13 and 14 were interconnected and those on structures 11 and 12 were interconnected, it would be equally satisfactory to interconnect strain gages on structures 12 and 13 and similarly interconnect strain gages on structures 11 and 14. Similarly, it would be equally satisfactory to interconnect strain gage elements on structures 11 and 13 and interconnect strain gage elements on beam structures 12 and 14. Physical and geometrical considerations generally establish which choice of interconnection is advantageous in a given structure.

Now assuming that the load sensitivities of all of the strain gage pairs and their respective beam structure are identical, the integral scale structure performs as follows. With the load or weight to be measured applied centrally to the scale at point "A", each of the beam structures is subjected to an identical load equivalent to one-fourth the applied load. The strain gage elements on each of the beam structures 11, 12, 13, 14 sense equal tensile and compressive strains. The resulting resistance changes in the strain gages in cooperation with the applied excitation voltage develop signals at the output terminals of Wheatstone Bridges 59 and 60 of FIG. 15 which in turn are added through parallel addition as a result of the parallel connection of bridges 59 and 60 in FIG. 15. This signal is proportional to the applied load.

Now again assuming that the sensitivities of the strain gage elements and their respective beam structures are identical, a description of the scale operation under eccentric or off-center loading conditions follows. For example, when the load is applied at point "B" in FIG. 1, the distribution of load sensed by the beam structures will be considerably different. In the former case of central loading, each of the beam elements was subjected to a load equivalent to one-fourth the total applied load. Now in the off-center loading condition beam structures 11 and 12 will be subjected to most of the applied load. Beam structures 13 and 14 and their associated strain gage sensing elements will be subjected to very little load. Therefore, the resistance changes and resulting output signals developed by the strain gage elements on beam structures 11 and 12 will be significantly lower. But, since the sensitivities of beam structures and associated strain sensing elements are identical, the resulting signal at the output terminals 62 of FIG. 15 will still be accurately related to the applied load even though it has been applied off-center. That is, the signal related to the sum or average of the individual loads will remain the same. Similar results occur if the load is applied at point "C" in FIG. 1 or any other point on the scale, proper.

Careful machining of the scale structure 1 and the hole and slot arrangements 2, 3, 4, 5, selection of strain gages with substantially identical sensitivities and accurate placement of those strain gages on their respective beam structures results in good off-center loading performance. However, in some applications such as in commercial or legal weighing, even better performance is required than can be achieved as a result of the above precautions. In the event that off-center loading errors occur which exceed the requirements, such errors can be reduced by changing the cross-sectional dimensions of the beam elements in the corners of the scale wherein the sensitivity to off-center loading in those corners is lower than the corner with the highest sensitivity.

In practice, one moves the applied load around the scale noting the relative output of the scale with the load applied substantially on each of the scale corners. The cross-sectional dimensions of the low output beam structures are modified by an appropriate grinding operation in which the thickness of the beam is decreased by removing material from the side of the beam inside the holes 6 adjacent to the strain gage elements or from the side of the beam opposite the strain gage elements. After the initial adjustments are made the off-center loading test is repeated again noting the relative scale outputs when the load is applied in each of the corners. The grinding operation is repeated until the desired off-center loading performance is attained. After some skill is developed, the adjustment operation can be completed with 3 or 4 iterations of the above procedure.

The advantages of the present scales are seen especially in that the platform and beam structures form an integral structure which is easily manufactured by the steps described above and those described in the following. Furthermore, in prior art scales comparable to this type, four strain gages are used for each transducer. This invention on the other hand, requires only two strain gage elements for each beam formed by two slots and four holes. Certainly, four strain gage elements could be used in each of the beam structures, but that is unnecessary.

The overall height of the scale can be substantially reduced because the beams are located directly in the plane of the platform. The resilient feet and the compliance of the bracket, for example 47, reduce the effects of shock loads on the present scale.

A further advantage of these scale embodiments is that manufacturing costs are greatly reduced, because simple drilling and sawing are most simple machining operations and may be easily performed on numerically controlled machine tools. Further, manufacturing economy is achieved by making a plurality of platforms simultaneously. For example, five to ten plates may be machined simultaneously when they are stacked one on top of the other and the hole clusters may be drilled through all plates in one operation. As mentioned, the slots or gaps may be simple saw cuts rather than milling cuts since the sensitivity of the beams is determined primarily by the hole size and spacing between adjacent holes rather than by the width of the slots. The drilling is precisely controlled, by numerically controlled drilling operations and hence beam sensitivity is well controlled. Thus, the costs for the manufacturing of the present scales is drastically reduced as compared to costs of prior art scales.

By properly selecting appropriate hole dimensions and spacing as well as plate thickness, platform scale capacities in the range of 25 lbs. to about 1,000 lbs. can be easily accommodated.

Scales with capacities in this range have exhibited excellent performance, with linearity and hysteresis characteristics of 0.02%.

Details, such as temperature compensation, electrical calibration, etc. well known to those skilled in the art have been omitted in the interest of simplicity and clarity.

Figure 16:
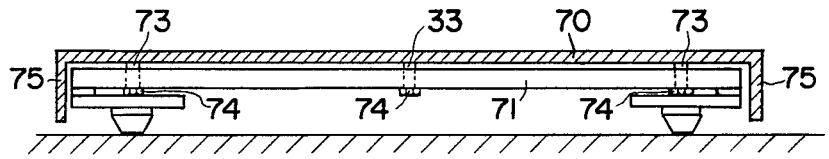
FIG. 16 is a side view of an embodiment with a cover plate, the latter being shown in section.
Figure 17:
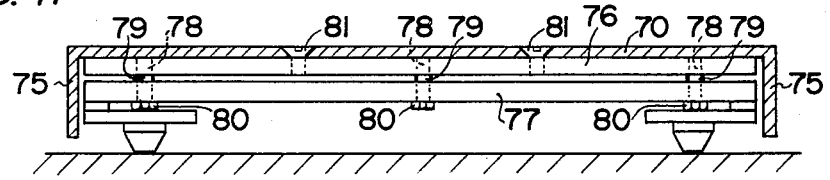
FIG. 17 is a view similar to that of FIG. 16 but showing an intermediate load distribution plate between the cover plate and the scale platform.

FIGS. 16 and 17 show alternative protective means. In FIG. 16 a simple thin, for example, rectangular, sheet metal cover 70 is secured to the platform structure 71 by means of weld studs 73 welded to the sheet metal cover 70 and nuts 74 assembled to the weld studs 73 which extend through the platform 71 to hold the cover 2 operatively in place. A thin sheet metal cover such as this is usable on lower capacity scales. The edges 75 of the cover 70 are sufficiently off the floor or table to not interfere with the flexing of the beam structures as described above.

FIG. 17 shows a higher capacity scale, for example, for loads exceeding 100 lbs. It has been found to be advantageous to secure an intermediate load distribution plate 76 to the platform structure 77 by means of screws 78, spacers 79 and nuts 80. The intermediate plate 76 is chosen to be of appropriate thickness for adequately supporting the applied load without substantial deflection. A thinner, rectangular sheet metal cover 70, as in FIG. 16, may be attached to the intermediate plate 76 by means of screws 81 or by some other suitable means.

Figure 18:
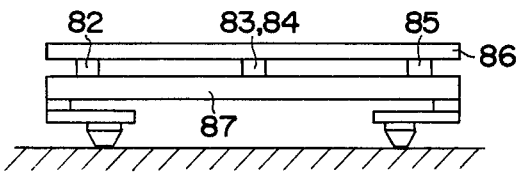
FIG. 18 shows a side view of a scale similar to that of FIG. 17 but without a cover and without load limiting means.
Figure 19:
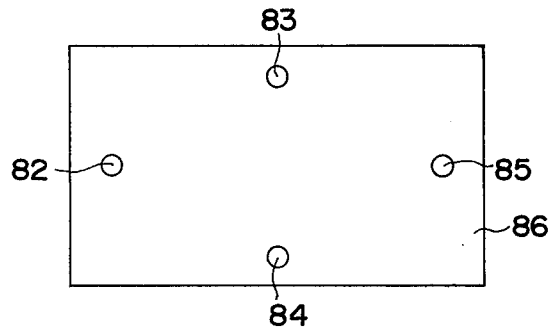
FIG. 19 shows a top plan view of the scale of FIG. 18 illustrating the location of the loading points.

FIGS. 18 and 19 illustrate the position or distribution of the loading points 82, 83, 84, 85 between an intermediate, load distribution plate 86 and a gaged platform 87. The cover plate is not shown in FIG. 18. The intermediate plate 86 may be connected to the platform as described above with reference to FIGS. 16, 17.

By connecting an intermediate plate to the platform the effects of moving the load off-center on the scale are further reduced, as compared to a scale of the same type but without an intermediate plate.

The optimal location of the points 82, 83, 84, 85 for connecting the two plates, is a function of the beam arrangements with respect to the gaged plate or platform and depends on the relative length, width and thickness of the gaged plate. The best orientation is easily found by using simple spacers and moving them around between both plates until the best location is found. Such locations are then valid for all scales of the same type.

Although the invention has been described with reference to specific example embodiments, it will be appreciated, that it is intended, to cover all modifications and equivalents within the scope of the appended claims.

What is claimed is:

1. A weighing apparatus, comprising platform means, beam structure means constructed as an integral part of said platform means, said beam structure means having a free end and a fixed end merging into said platform means, strain gage means operatively secured to said beam structure means, spacer means, and foot means operatively secured to said free end of the beam transducer means through said spacer means.

2. The apparatus of claim 1, further comprising bracket means secured to said spacer means, said foot means being secured to said bracket means.

3. The apparatus of claim 1, wherein said beam structure means comprise slots cut into said platform means and holes drilled into said platform means substantially at the ends of said slots and intermediate the ends of the slots.

4. The apparatus of claim 1, wherein said platform means comprise four rectangular corners and one of said beam structure means is arranged substantially near each of said rectangular corners of the platform means.

5. The apparatus of claim 1, wherein said platform means comprise four rectangular corners and one of said beam structure means is arranged substantially intermediate each of two adjacent ones of said corners.

6. The apparatus of claim 1, wherein said platform means has a substantially curved outer boundary, and wherein said beam structure means comprise four beam structures spaced by 90° from one another.

7. The apparatus of claim 1, further comprising cover means secured to said platform means to protect said beam structure means and said strain gage means.

8. The apparatus of claim 1, further comprising load distribution plate means operatively secured to said platform means.

9. The apparatus of claim 8, further comprising spacer means operatively inserted between said load distribution plate means and said platform means, whereby off center loading performance is further improved.

10. The apparatus of claim 1, wherein said shear beam transducer means comprise four beam structures formed by eight slots cut into said platform means and by sixteen holes drilled into said platform means in groups of four so that one hole is located substantially at each end of each slot and one hole is located intermediate the ends of each slot.

11. The apparatus of claim 10, wherein said strain gage means comprise a plurality of strain gages connected in groups of four to form respective bridge circuits.

12. The apparatus of claim 10, wherein said strain gage means comprise eight strain gages operatively secured to said four beam structures in groups of two.

13. The apparatus of claim 12, wherein said eight strain gages are operatively connected to form two bridge circuits which are connected in parallel to each other.

14. The apparatus of claim 1, further comprising overload limit means operatively arranged to limit the flexing of said beam structure means.

15. The apparatus of claim 14, further comprising bracket means having one end secured to said spacer means, said foot means being secured to the other end of said bracket means, said overload limit means being operatively secured to said platform means opposite said other end of said bracket means to limit the flexing of said beam structure means.

16. The apparatus of claim 14, wherein said spacer means have a given width, said beam structure means having a width smaller than said given width of said spacer means whereby portions of said spacer means extending outside said beam structure means sufficiently to contact said platform means for providing said overload limit means.

17. The apparatus of claim 14, wherein said beam structure means have a given width, said overload limit means comprising a cross member wider than said given width of said beam structure means, said cross member being operatively arranged between shim spacer means and said foot means to reach across said beam structure means whereby the ends of said cross member may contact said platform means to limit the flexing of said beam transducer means.

18. The apparatus of claim 17, further comprising bracket means operatively arranged between said cross member and said foot means.

19. A method of manufacturing a weighing apparatus, comprising the following steps: preparing a platform means, drilling a plurality of holes into said platform means in groups of four holes each, machining a plurality of slots into said platform means inwardly from the edges thereof so that two slots each extend in parallel to each other and so that each slot connects two holes, whereby two slots form a beam structure as an integral part of said platform means, and securing strain gage means to said beam structure.

20. The method of claim 19, wherein said strain gage means are secured to the beam structure between two adjacent holes.

21. The method of claim 19, wherein a plurality of prepared platform means are stacked and drilled and slotted together as a group.

22. The method of claim 19, comprising adjusting the sensitivity of each transducer of the scale by grinding material off the wall of said drilled hole or holes to such an extent that the off-center load sensitivity of the scale is reduced.

23. The method of claim 19, comprising adjusting the sensitivity of each transducer of the scale by grinding material off the surface of the beam elements opposite the surface on which the strain gage means are located to such an extent that the off-center load sensitivity of the scale is reduced.

* * * * *

UNITED STATES PATENT OFFICE
CERTIFICATE OF CORRECTION

Patent No. 4,261,429                    Dated April 14, 1981

Inventor(s)  Harry E. Lockery

It is certified that error appears in the above-identified patent and that said Letters Patent are hereby corrected as shown below:

In claim 10, line 1, "shear" should be deleted.

Signed and Sealed this

Fourth Day of August 1981

[SEAL]

Attest:

GERALD J. MOSSINGHOFF

Attesting Officer          Commissioner of Patents and Trademarks